United States Patent
Cui et al.

(10) Patent No.: US 12,046,225 B2
(45) Date of Patent: Jul. 23, 2024

(54) AUDIO SYNTHESIZING METHOD, STORAGE MEDIUM AND COMPUTER EQUIPMENT

(71) Applicant: Tencent Technology (Shenzhen) Company Limited, Shenzhen (CN)

(72) Inventors: Lingrui Cui, Shenzhen (CN); Yi Lu, Shenzhen (CN); Yiting Zhou, Shenzhen (CN); Xinwan Wu, Shenzhen (CN); Yidong Liang, Shenzhen (CN); Xiao Mei, Shenzhen (CN); Qihang Feng, Shenzhen (CN); Fangxiao Wang, Shenzhen (CN); Huifu Jiang, Shenzhen (CN); Shangzhen Zheng, Shenzhen (CN); Le Yu, Shenzhen (CN); Shengfei Xia, Shenzhen (CN); Jingxuan Wang, Shenzhen (CN); Ran Zhang, Shenzhen (CN); Yifan Guo, Shenzhen (CN); Zhenyun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 797 days.

(21) Appl. No.: 16/990,869

(22) Filed: Aug. 11, 2020

(65) Prior Publication Data
US 2020/0372896 A1    Nov. 26, 2020

Related U.S. Application Data

(63) Continuation of application No. PCT/CN2019/089678, filed on May 31, 2019.

(30) Foreign Application Priority Data
Jul. 5, 2018 (CN) .......................... 201810730283.3

(51) Int. Cl.
*G10L 13/033*    (2013.01)
*G06F 16/638*    (2019.01)
(Continued)

(52) U.S. Cl.
CPC .......... *G10L 13/033* (2013.01); *G06F 16/638* (2019.01); *G06F 16/686* (2019.01);
(Continued)

(58) Field of Classification Search
CPC ... G10L 13/033; G06F 16/638; G06F 16/686; G10H 7/00; G10H 2210/021; G10H 2210/101; G10H 2240/141; G11B 27/02
See application file for complete search history.

(56) References Cited

U.S. PATENT DOCUMENTS 7,792,782 B2   9/2010   Yun
9,305,530 B1   4/2016   Durham et al.
(Continued)

FOREIGN PATENT DOCUMENTS

CN    101789255 A    7/2010
CN    102193992 A    9/2011
(Continued)

OTHER PUBLICATIONS

Tencent Technology, ISR, PCT/CN2019/089678, Sep. 9, 2019, 3 pgs.
(Continued)

*Primary Examiner* — Mohammad K Islam
(74) *Attorney, Agent, or Firm* — Morgan, Lewis & Bockius LLP

(57) ABSTRACT

This application relates to an audio synthesis method, a storage medium, and a computer device. The method includes: obtaining a target text; determining a target song according to a selection instruction; synthesizing a self-made song using the target text and tune information of the
(Continued)

target song according to a tune control model, the target text being used as the lyrics of the self-made song. The solutions provided in this application improve an audio playback effect.

15 Claims, 8 Drawing Sheets

(51) Int. Cl.
    *G06F 16/68*     (2019.01)
    *G10H 7/00*     (2006.01)
    *G11B 27/02*     (2006.01)

(52) U.S. Cl.
    CPC ............... *G10H 7/00* (2013.01); *G11B 27/02* (2013.01); *G10H 2210/021* (2013.01); *G10H 2210/101* (2013.01); *G10H 2240/141* (2013.01)

(56) References Cited

U.S. PATENT DOCUMENTS

| | | | |
|---|---|---|---|
| 10,818,308 B1 * | 10/2020 | Chu | ............ G10L 15/26 |
| 2011/0219940 A1 | 9/2011 | Jiang | |
| 2021/0158789 A1 * | 5/2021 | Wu | ............ G06N 3/08 |
| 2021/0201863 A1 * | 7/2021 | Bosch Vicente | ......... G10H 1/36 |

FOREIGN PATENT DOCUMENTS

| | | | | |
|---|---|---|---|---|
| CN | 103117057 A | | 5/2013 | |
| CN | 105068748 A | | 11/2015 | |
| CN | 106131475 A | | 11/2016 | |
| CN | 106652984 A | | 5/2017 | |
| CN | 106971703 A | | 7/2017 | |
| CN | 107799119 A | | 3/2018 | |
| CN | 107430849 B | * | 2/2021 | ............... G10H 1/00 |
| CN | 115346503 A | * | 11/2022 | ........... G06F 16/686 |
| JP | 2002502510 A | * | 5/1998 | ............. G10H 1/366 |
| JP | 2002132281 A | | 5/2002 | |
| JP | 2003195876 A | | 7/2003 | |
| JP | 2005321706 A | | 11/2005 | |
| JP | 5598056 B2 | * | 10/2014 | ............. G10K 15/04 |
| JP | 2017032839 A | | 2/2017 | |
| JP | 2017532608 A | | 11/2017 | |
| TW | 200515186 A | | 5/2005 | |
| TW | I394142 B | * | 8/2009 | ............. G10L 13/00 |
| TW | 201312547 A | | 3/2013 | |
| WO | WO-2014088036 A1 | * | 6/2014 | ........... G10H 1/0066 |
| WO | WO-2023058173 A1 | * | 4/2023 | ............... G10H 1/00 |

OTHER PUBLICATIONS

Tencent Technology, WO, PCT/CN2019/089678, Sep. 9, 2019, 4 pgs.
Tencent Technology, IPRP, PCT/CN2019/089678, Jan. 5, 2021, 5 pgs.
Extended European Search Report, EP19830395.0, Sep. 2, 2021, 13 pgs.
Masanari Nishimura et al., "Singing Voice Synthesis Based on Deep Neural Networks", INTERSPEECH 2016, Department of Scientific and Engineering Simulation, Nagoya, Japan, Sep. 8, 2016, XP055627666, ISSN: 1990-9772, 5 pgs.
Tencent Technology, KR Office Action, Korean Patent Application No. 10-2020-7024631, Jul. 19, 2022, 14 pgs.
Tencent Technology, European Office Action, EP Patent Application No. 19830395.0, Jul. 6, 2023, 6 pgs.
Tencent Technology, European Office Action, EP Patent Application No. 19830395.0, Dec. 12, 2023, 4 pgs.

\* cited by examiner

AUDIO SYNTHESIZING METHOD, STORAGE MEDIUM AND COMPUTER EQUIPMENT

CROSS REFERENCE TO RELATED APPLICATIONS

This application is a continuation application of PCT Patent Application No. PCT/CN2019/089678, entitled "AUDIO SYNTHESIZING METHOD, STORAGE MEDIUM AND COMPUTER EQUIPMENT" filed on May 31, 2019, which claims priority to Chinese Patent Application No. 201810730283.3, entitled "AUDIO SYNTHESIS METHOD AND APPARATUS, STORAGE MEDIUM, AND COMPUTER DEVICE" filed Jul. 5, 2018, all of which are incorporated by reference in their entirety.

FIELD OF THE TECHNOLOGY

This application relates to the field of computer technologies, and in particular, to an audio synthesis method, a storage medium, and a computer device.

BACKGROUND OF THE DISCLOSURE

With the development of computer technologies, an increasing quantity of computer devices such as smartphones and tablet computers have an audio playback function. In this case, it is increasingly popular for users to choose to listen to songs in leisure time to reduce work-related stress and have more fun in life or use songs as background audio to shoot videos or the like.

Currently, a user usually selects a song from a song library for playback. However, a limited quantity of songs are selectable in the song library for copyright issues or the like. Consequently, it is difficult for the user to select a satisfactory song from these songs, resulting in a relatively poor audio playback effect.

SUMMARY

Embodiments of this application provide an audio synthesis method, a storage medium, and a computer device, to improve an audio playback effect. The technical solutions are as follows:

According to an aspect, an audio synthesis method is performed at a computer device having a processor and memory storing a plurality of programs to be executed by the processor, the method comprising:
  obtaining a target text;
  determining a target song according to a selection instruction;
  synthesizing a self-made song using the target text and tune information of the target song according to a tune control model, the target text being used as the lyrics of the self-made song; and
  playing the self-made song.

According to an aspect, a non-transitory computer-readable storage medium is provided, storing a plurality of computer programs, the computer programs, when executed by a processor of a computer device, causing the computer device to perform the aforementioned audio synthesis method.

According to an aspect, a computer device is provided, including a memory and a processor, the memory storing a plurality of computer programs, the computer programs, when executed by the processor, causing the computer device to perform the aforementioned audio synthesis method.

DESCRIPTION OF EMBODIMENTS

To make the objectives, technical solutions, and advantages of this application clearer and more comprehensible, the following further describes this application in detail with reference to the accompanying drawings and embodiments. It is to be understood that the specific embodiments described herein are merely used for explaining this application but are not intended to limit this application.

Figure 1:
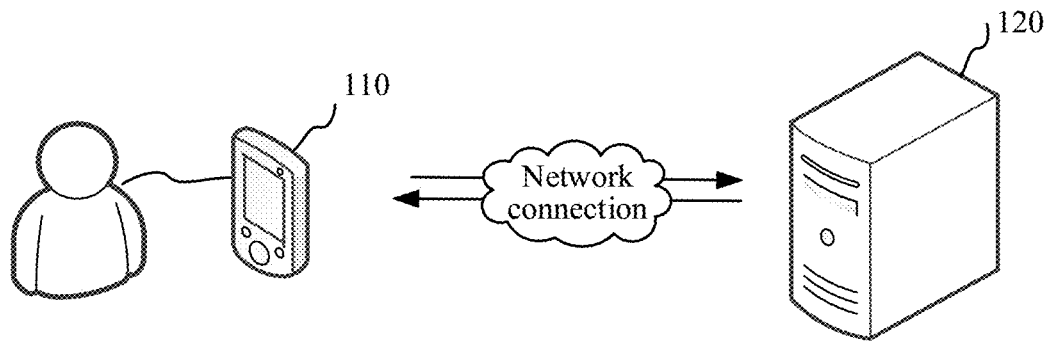
FIG. 1 is a diagram of an application environment of an audio synthesis method according to an embodiment.

FIG. 1 is a diagram of an application environment of an audio synthesis method according to an embodiment. Referring to FIG. 1, the audio synthesis method is applied to an audio synthesis system. The audio synthesis system includes a terminal 110 and a server 120. The terminal 110 and the server 120 are connected by a network. The terminal 110 may be specifically a desktop terminal or a mobile terminal. The mobile terminal may be specifically at least one of a mobile phone, a tablet computer, a notebook computer, and the like. The server 120 may be specifically an independent server or may be a server cluster including a plurality of independent servers.

The terminal 110 may be configured to perform the audio synthesis method. The terminal 110 may invoke, based on an operating system thereof, interfaces to perform the audio synthesis method. Certainly, the terminal 110 may alternatively perform the audio synthesis method based on an installed application client.

In the foregoing process, the application client may be a client providing an audio synthesis service. For example, the application client may be a client configured to play a short video. After logging in to the application client, a user may play a short video based on the application client. Optionally, the user may also record a short video based on the application client. Before recording starts, the user may set background audio of the short video to be recorded. For example, the terminal 110 may provide a plurality of candidate songs to the user and determine the background audio of the short video according to a selection instruction of the user, so as to add the background audio to the currently recorded short video when receiving a recording instruction.

The terminal 110 may upload the recorded short video to the server 120 for playback by users other than the user. Certainly, the user may also first record a short video, perform an editing operation on the short video after the recording is completed, add the background audio to the recorded short video by using the editing operation, and then upload the edited short video to the server 120.

However, for copyright issues or the like, a limited quantity of songs are selectable in a song library of background audio. Consequently, it is difficult for the user to select a satisfactory song from these songs for playback, resulting in a relatively poor audio playback effect. Therefore, the terminal 110 may improve the audio playback effect by using the audio synthesis method in the embodiments of this application.

In some embodiments, the terminal 110 may obtain a target text; determine a target song selected by a selection instruction; and obtain a self-made song synthesized according to a tune control model, the target text, and tune information of the target song, the obtained target text being used as the lyrics of the self-made song. After obtaining the self-made song, the terminal 110 may play the self-made song. Further, the terminal 110 may configure the self-made song as background audio, and record a video based on the background audio.

In the foregoing process, the self-made song may be locally synthesized on the side of the terminal 110. Certainly, the self-made song may be alternatively synthesized on the side of the server 120 and transmitted to the terminal 110. A synthesis side of the self-made song is not specifically limited in the embodiments of this application.

In some embodiments, in a case that the self-made song is locally synthesized by the terminal 110, the terminal 110 synthesizes the self-made song according to the tune control model, the target text, and the tune information of the target song. Optionally, the tune control model herein may be trained by the server 120 and delivered to the terminal 110 or may be locally trained by the terminal 110.

In some embodiments, in a case that the self-made song is synthesized by the server 120 and transmitted to the terminal 110, the terminal 110 transmits the target text and a song identifier of the target song to the server 120. The server 120 synthesizes the self-made song according to the tune control model, the target text, and the tune information of the target song, and transmits the self-made song to the terminal 110.

Figure 2:
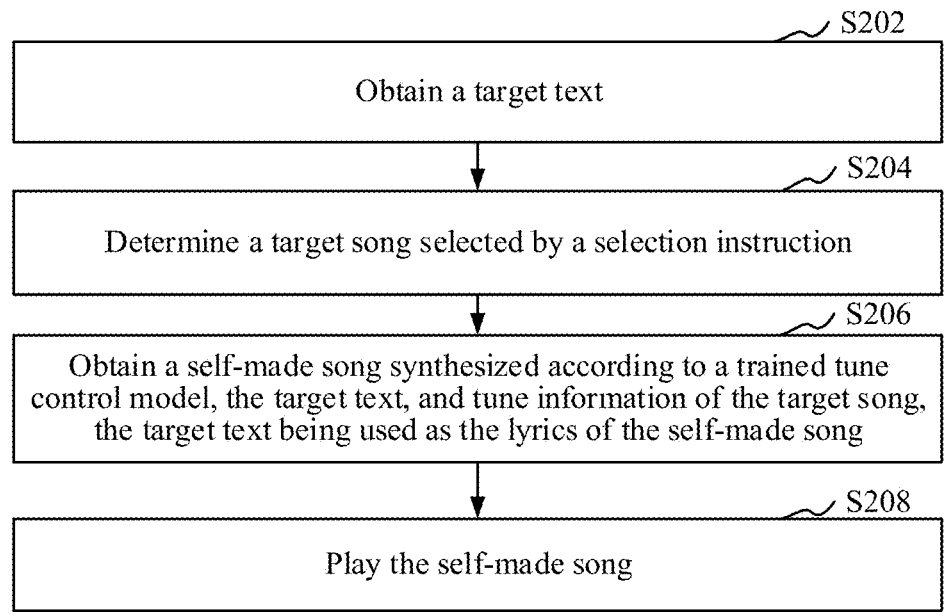
FIG. 2 is a schematic flowchart of an audio synthesis method according to an embodiment.

FIG. 2 is a schematic flowchart of an audio synthesis method according to an embodiment. This embodiment is described mainly by using an example in which the audio synthesis method is applied to the terminal 110 in FIG. 1. Referring to FIG. 2, the method specifically includes the following steps:

S202: A terminal obtains a target text.

The target text is used for providing lyrics for a to-be-synthesized self-made song. Specifically, the target text may be a text inputted by a user by using a text input box provided by the terminal, a text selected by a selection instruction by a user from a text template list provided by the terminal or a text transmitted by another computer device. Certainly, the target text may be alternatively a text from another source. A source and an obtaining manner of the target text are not limited in this embodiment of this application.

Figure 3:
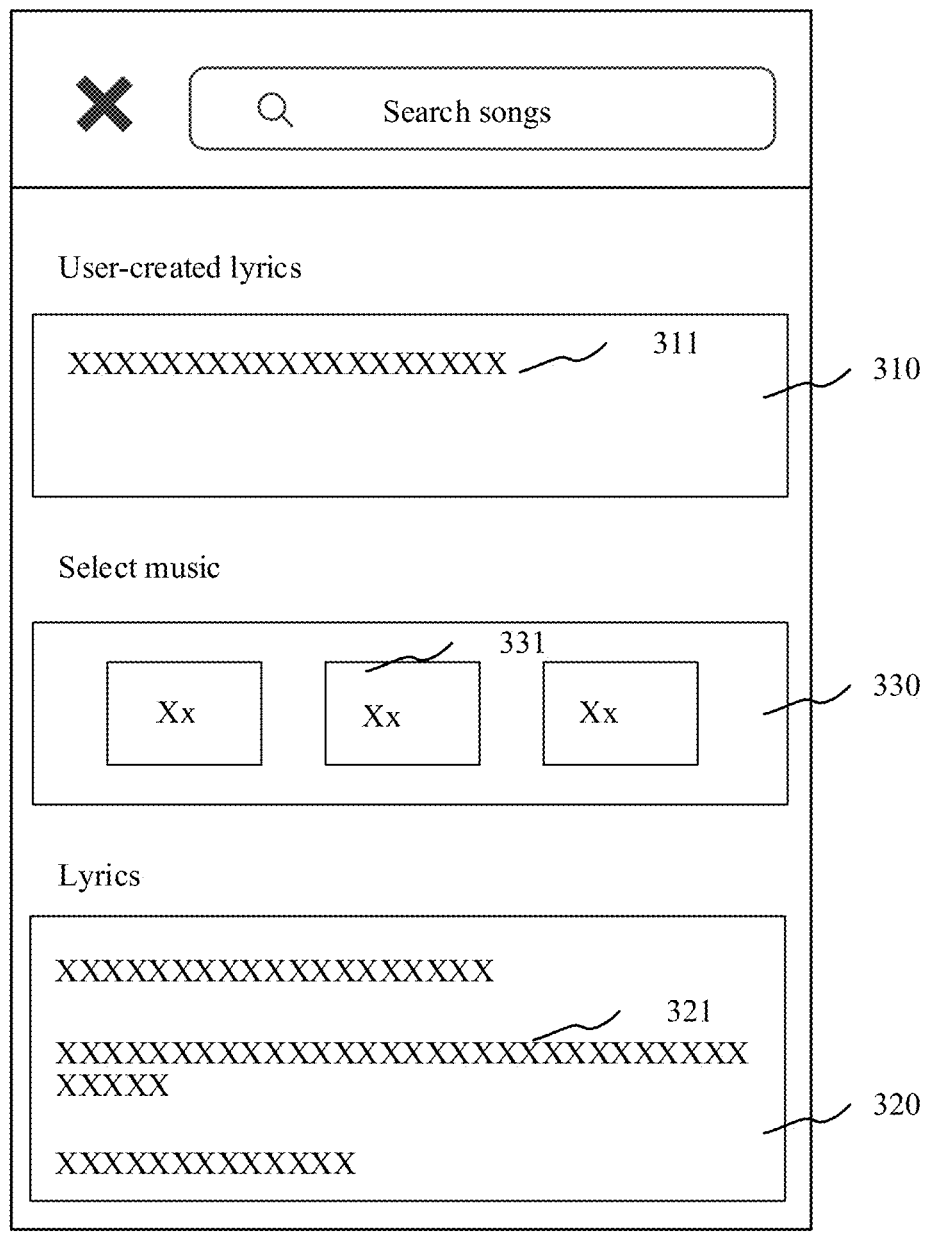
FIG. 3 is a schematic diagram of an interface for obtaining a target text according to an embodiment.

For example, FIG. 3 is a schematic diagram of an interface for obtaining a target text according to an embodiment. Referring to FIG. 3, the interface includes a text input box 310 and a text template list 320. The user may input a text 311 into the text input box 310, so that the terminal obtains the text 311 inputted by the user into the text input box 310 as the target text. The user may alternatively select a text in the text template list 320, so that the terminal obtains a text 321 selected by the user from the text template list 320 as the target text.

S204: The terminal determines a target song selected by a selection instruction.

The target song is used for providing a tune for the to-be-synthesized self-made song. For example, if the user wants to use the tune of the song "Twinkle, Twinkle, Little Star" as the tune of the self-made song to synthesize a song, "Twinkle, Twinkle, Little Star" is the target song. In another example, if the user wants to use the tune of the song "Brother John" as the tune of the self-made song to synthesize a song, "Brother John" is the target song.

In an embodiment, the terminal may provide candidate songs, and receive a selection instruction of the user for a candidate song, to obtain the candidate song selected by the selection instruction as the target song.

Specifically, the terminal may display candidate songs in the interface, then monitor a predefined trigger operation on the displayed candidate songs, and trigger the generation of a corresponding selection instruction when detecting the trigger operation. The trigger operation may be a touch operation or a cursor clicking operation on the candidate song displayed in the interface. The trigger operation may be alternatively the pressing of a predefined physical key or a shake operation triggered when the candidate songs are displayed or played one by one.

In another embodiment, the terminal may alternatively randomly select a song from the candidate songs as the target song. The terminal may alternatively select a song matching the target text from the candidate songs as the target song.

For example, still referring to FIG. 3, the interface further includes a candidate song list 330. The user may select a song in the candidate song list 330, so that the terminal obtains a song 331 selected by the user from the candidate song list 330 as the target song.

S206: The terminal obtains a self-made song synthesized according to a tune control model, the target text, and tune information of the target song, the target text being used as the lyrics of the self-made song.

The tune control model may be a machine learning (ML) model having a tune control capability. The ML model may acquire the tune control capability through sample learning. The ML model may be a neural network model, a support Vector Machine, a logistic regression model or the like. The neural network model is, for example, a convolutional neural network, a back propagation neural network, a feedback neural network, a radial basis function neural network, a self-organizing neural network or the like. The type of the ML model is not limited in this embodiment of this application provided that the ML model can implement a tune control function.

The tune information is data that reflects the changing trend of the pitch of a song with time. The tune has two basic elements, that is, a melody (or referred to as a pitch) and a rhythm. The terminal may represent the tune information by using a correspondence between a series of pitches and corresponding time information. The time information herein is used for reflecting the rhythm, for example, the start time of a pitch, the duration of a pitch, or the duration of a pause between different pitches. One pitch represents one note. Acoustic parameters of a note include fundamental frequency and intensity.

It may be understood that, a song is a form of artistic expression combining lyrics and a tune. The target song is audio data obtained by a song singer singing lyrics and a tune created by a song writer. In this embodiment, the tune of the target song is kept unchanged and the lyrics are changed to synthesize a self-made song with the same tune. Certainly, in this embodiment of this application, the tune of the target song may also be adjusted according to the changed lyrics to synthesize a self-made song.

The self-made song is a song with customized lyrics. The tune of an existing song is used as the tune of the self-made song. Certainly, the tune of the self-made song may also be customized. The terminal synthesizes the self-made song according to original lyrics and a customized tune or synthesizes the self-made song according to customized lyrics and a customized tune. The self-made song synthesized according to the customized lyrics and the customized tune is a user-created song.

In an embodiment, the tune information of the target song may be data extracted from a song file of the target song. For example, a musical instrument digital interface (MIDI) file is extracted from the song file of the target song and used as the tune information of the target song. It may be understood that, because the MIDI file includes pitches and corresponding time information and the tune information may be represented by the correspondence between a series of pitches and corresponding time information, the pitches and corresponding time information included in the MIDI file may form the tune information.

In an embodiment, the tune information of the target song may be extracted from the audio data sung by the song singer. The audio data sung by the song singer may be audio data with a background accompaniment or may be audio data of a vocals-only song. The audio data of the vocals-only song is data that records a singing voice of the song singer without background music. The terminal may record the audio data sung by the song singer corresponding to the target song, and then extract the tune information from the audio data. The tune information may be extracted by using a constructed model. Certainly, the tune information of the target song may be alternatively obtained in another manner. This is not limited in this embodiment of this application.

Specifically, after determining the target song selected by the selection instruction, the terminal may search for the tune information of the selected target song, and then input the target text and the found tune information into the tune control model, to output the self-made song with the target text as the lyrics and the tune of the target song as the tune by using the tune control model.

Optionally, the terminal may alternatively first generate an acoustic spectral feature corresponding to the target text based on a text to speech (TTS) technology, input the acoustic spectral feature and the tune information into the tune control model, convert a tune of the acoustic spectral feature into a tune matching the tune information by using the tune control model to obtain the self-made song, and output an acoustic spectral feature of the self-made song.

In the foregoing process, songs with the same tune sung by different singers usually have the same tune information. In this case, a plurality of acoustic spectral features that correspond to the target text and correspond to a plurality of singers are generated, and one self-made song may be generated for each acoustic spectral feature, so that a plurality of self-made songs can be generated according to the plurality of acoustic spectral features and the tune information. Different self-made songs have the same tune but different timbres, so that varied options are provided in an audio synthesis process.

In an embodiment, S206 includes: transmitting, by the terminal, the target text and a song identifier of the target song to a server, the target text and the song identifier being used for instructing the server to synthesize, after tune information corresponding to the song identifier is found, the self-made song according to the tune control model, the target text, and the tune information; and receiving, by the terminal, the self-made song fed back by the server.

The song identifier is used for uniquely identifying a song. Specifically, after determining the target song selected by the selection instruction, the terminal may transmit the song identifier of the target song and the obtained target text to the server. In this way, after receiving the song identifier, the server searches for the tune information corresponding to the song identifier, inputs the tune information and the target text into the tune control model, and outputs the self-made song with the target text as the lyrics and the tune consistent with that of the target song by using the tune control model. Then, the server may return the self-made song to the terminal.

The self-made song may be a self-made vocals-only song or may be a self-made song with a background accompaniment. When the self-made song is a self-made vocals-only song, the server directly feeds back the self-made vocals-only song to the terminal, or feeds back the self-made song obtained by mixing the self-made vocals-only song and the background accompaniment to the terminal. Alternatively, both the self-made vocals-only song and the self-made song are fed back to the terminal, and are displayed by the terminal for the selection by the user.

In this embodiment, in the step of implementing audio synthesis on the server side, the efficiency of audio synthesis is improved by using a powerful and high-speed computing capability of the server.

S208: The terminal plays the self-made song.

Specifically, after synthesizing the self-made song or receiving the self-made song fed back by the server, the terminal may play the self-made song, so that the user may listen to the played self-made song to determine whether the self-made song is satisfactory, so as to perform a subsequent operation when the self-made song is satisfactory.

Optionally, the terminal may alternatively skip the foregoing step S208 after synthesizing the self-made song, but store the self-made song locally or upload the self-made song to the server. When receiving a play instruction at a moment, the terminal performs the foregoing step S208.

In the foregoing audio synthesis method, after the target text is obtained and the target song selected by the selection instruction is determined, the self-made song synthesized by using the target text as the lyrics and in combination with the tune information of the target song may be obtained by using the tune control model. In this way, the user can independently select lyrics and a tune to customize a satisfactory song, to play the satisfactory song, thereby greatly improving an audio playback effect.

In an embodiment, the audio synthesis method further includes: configuring, by the terminal, the self-made song as background audio, and recording a video based on the background audio.

Specifically, after synthesizing the self-made song or receiving the self-made song fed back by the server, the terminal may automatically configure the self-made song as the background audio, and invoke a local image acquisition device to get ready to record the video. Alternatively, the terminal may configure the synthesized self-made song as the background audio according to an instruction triggered by the user, and then invoke the local image acquisition device to get ready to record the video. In this way, the terminal may record the video by using the synthesized self-made song as the background audio.

In a specific embodiment, a video recording application is installed on the terminal. The terminal may run the video recording application according to a user instruction, and continue to enter a background audio configuration interface (for example, the interface shown in FIG. 3) according to the user instruction. The terminal may further obtain the target text input by the user and the target song selected by the user, determine the tune information of the target song, and synthesize the self-made song by using the target text as the lyrics and in combination with the determined tune information. The terminal may further configure the synthesized self-made song as the background audio, enter a video recording page, play the configured background audio according to the user instruction, and acquire an image to record the video.

In this embodiment, the user independently selects the lyrics and the tune, customizes the satisfactory song, and then uses the customized song as the background audio to record the video, so that there are richly varied sources of background audio and the efficiency of video recording is improved.

In an embodiment, S206 includes: searching for, by the terminal, the tune information matching the target song; inputting the target text and the tune information into the tune control model, and determining a tune feature corresponding to each character in the target text according to the tune information by using a hidden layer of the tune control model; and outputting, by using an output layer of the tune control model, the self-made song obtained after speech synthesis is performed on each character in the target text according to the corresponding tune feature.

Specifically, after determining the target song selected by the selection instruction, the terminal searches for the tune information of the target song obtained in advance, inputs the target text and the tune information into the trained tune control model, performs tune matching on each character in the target text by using the hidden layer of the tune control model, to determine the tune feature corresponding to each character in the target text, and then outputs, by using the output layer of the tune control model, the self-made song obtained after speech synthesis is performed on each character in the target text according to the corresponding tune feature.

In an embodiment, the audio synthesis method further includes a step of training a tune control model. The training a tune control model includes: collecting, by the terminal, candidate song audio corresponding to the candidate songs; determining a candidate song tune corresponding to each candidate song according to the collected candidate song audio; obtaining a text sample; and obtaining the tune control model through training according to the text sample and the candidate song tune.

Specifically, the terminal may record, for each candidate song, audio data sung by a song singer, and perform tune feature annotation on the audio data, to obtain tune information of a corresponding candidate song; or obtain a MIDI file of each candidate song as the tune information of the corresponding candidate song. The terminal may then randomly select a character string as the text sample, and use the text sample and the tune information of the candidate song as a training sample of the tune control model. The text sample and the candidate song are processed by using the layers in the tune control model, to output a song sample with the text sample as the lyrics and the tune conforming to the inputted tune information. The terminal may further adjust, according to a difference between the outputted song sample and an expected result, a model parameter of the tune control model and the tune information, used as the input, of the candidate song. After adjusting the parameter, the terminal may continue with the training until the training of the tune control model is completed. After obtaining the tune control model through training, the terminal may locally store the tune control model, to obtain and use the tune control model when the tune control model needs to be used.

In an embodiment, the difference between the song sample outputted by the tune control model and the expected result may be manually determined. The tune control model is a universal model for candidate songs.

In an embodiment, the model training process may be alternatively performed on the server. After completing the training of the tune control model, the server delivers the tune control model to the terminal for use.

In the foregoing embodiment, the tune control capability is learned by using the strong learning capability of the ML model, and speech synthesis is performed by using the trained tune control model. Compared with a conventional speech synthesis manner, the efficiency of speech synthesis is improved, and the accuracy of speech synthesis is improved.

In an embodiment, the audio synthesis method further includes: determining, by the terminal, a target speaking object. S206 includes: searching for, by the terminal, a tune control model corresponding to the target speaking object; and obtaining, by the terminal, the self-made song synthesized according to the found tune control model, the target text, and the tune information of the target song, the timbre of the self-made song conforming to the target speaking object.

The target speaking object is an object to which a target timbre belongs. The target timbre is a voice feature of a self-made song or a self-made speech that the user intends to synthesize. The target speaking object may be a virtual object or a real object. The virtual object is, for example, a virtual character in a game or a virtual character in an animation. The real object is, for example, a singer or an actor in a real scene.

It may be understood that, different sound generators generate sounds of different timbres due to different materials or structures. For example, a piano, a violin and a human have different timbres, generating different sounds. Different people also have different timbres. The timbre is a feature of sound. Sounds of the same pitch and the same sound intensity also have different timbres.

The tune control model corresponding to the target speaking object is a tune control model obtained through training according to audio data sung by a target speaker. In this way, the timbre of the self-made song outputted by the tune control model obtained through training conforms to the target speaking object. The tune control model described in the foregoing embodiment does not limit the singer of audio data used for training. That is, the timbre is not limited.

Specifically, the terminal may determine the target speaking object selected by the selection instruction subsequently, or the terminal may obtain a singer of the target song as the target speaking object. Further, the terminal then inputs the target text and the tune information of the target song into the tune control model corresponding to the target speaking object to synthesize the self-made song.

It may be understood that, the tune control model corresponding to the target speaking object is a tune control model matching timbre information of the target speaking object. The terminal inputs the target text and the tune information into the trained tune control model matching the timbre information of the target speaking object, performs tune matching on each character in the target text by using a hidden layer of the tune control model, to determine a tune feature corresponding to each character, and outputs, by using an output layer of the tune control model, the self-made song that is obtained after speech synthesis is performed on each character in the target text according to the corresponding tune feature and conforms to the timbre of the target speaking object.

Certainly, when the terminal implements the process by using a model, an end-to-end conversion (from the target text into the self-made song) may be implemented by using one model or may be implemented by using a plurality of models. The models cooperate with each other, and each model implements one function. For example, the target text is first converted by using a timbre control model into a self-made speech with the timbre conforming to the target speaking object, and the self-made speech is then converted by using the tune control model into the self-made song with the tune conforming to the target song. For the timbre control model herein, refer to the following descriptions. The data inputted for training the tune control model herein is no longer the target text and the tune information, but the self-made speech outputted by the timbre control model and the tune information.

It may be understood that, in this embodiment, a song in which user-defined lyrics are sung in a sound selected by the user may be synthesized. For example, a user-made song is sung in the voice of a star to complete song creation.

In an embodiment, the terminal may further perform security detection on the obtained target text. When the target text conforms to a rule, a subsequent operation is performed. When the target text does not conform to the rule, an error prompt is fed back. Alternatively, the step of performing security detection on the target text may be performed by the server.

Figure 4:
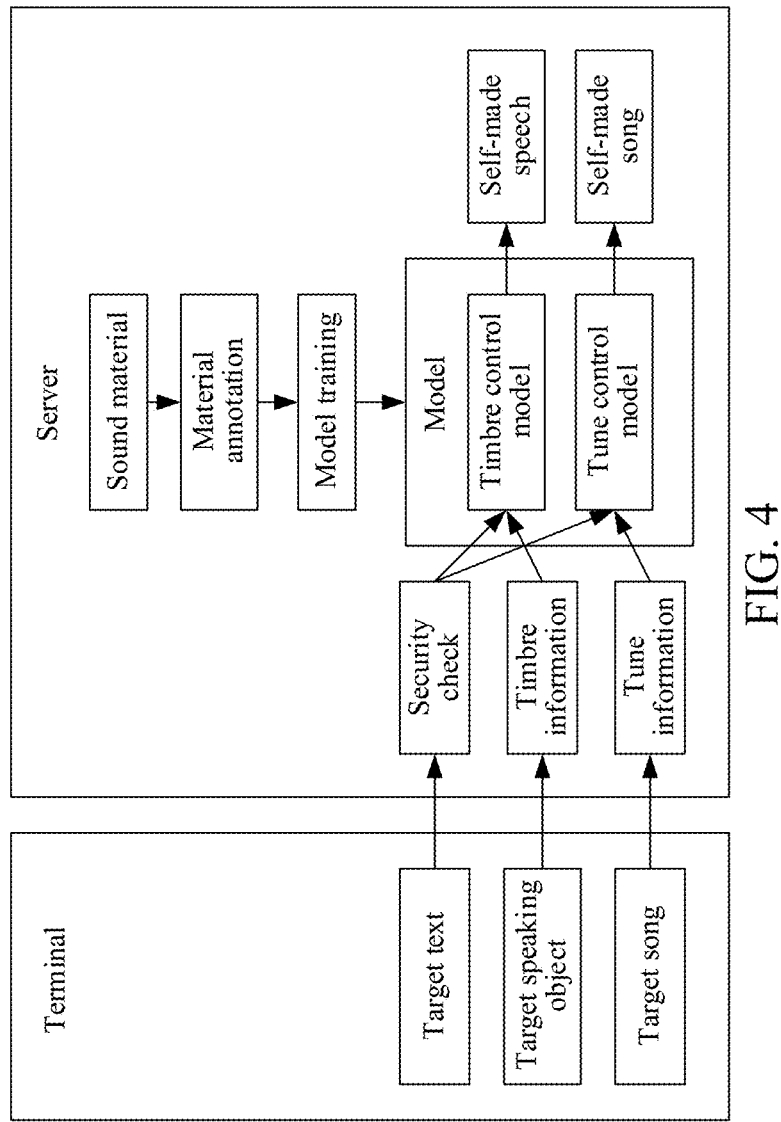
FIG. 4 is a block diagram of a principle of synthesizing a self-made song according to an embodiment.

For example, FIG. 4 is a block diagram of a principle of synthesizing a self-made song according to an embodiment. Referring to FIG. 4, a server (or a terminal) may collect a sound material (audio data of a candidate speaking object) in advance, annotate the collected sound material (a phoneme, fundamental frequency, sound intensity, time information, and the like), and train a model according to the collected sound material and annotation data. The model herein may be a timbre control model, a common tune control model, a tune control model corresponding to each candidate speaking object or the like. Different models may be obtained through training according to different data and annotation data selected from the sound material as an input of the model. The server (or the terminal) may store the model obtained through training for use or the server may deliver the model to the terminal for use.

After obtaining a target text, the terminal may upload the target text to the server, and the terminal may further upload an identifier of a target song or a target speaking object selected by the user to the server. The server performs security check on the target text. After the security check succeeds, when the user selects the target speaking object, a self-made speech corresponding to the target text is obtained according to a phoneme sequence of the target text by using the timbre control model obtained through training. Alternatively, when the user selects the target song, a self-made song with the target text as the lyrics is obtained according to tune information of the target song by using the tune control model obtained through training. Alternatively, when the user selects the target song and the target speaking object, a self-made song with the target text used as the lyrics is obtained according to the phoneme sequence of the target text and the tune information of the target song by using the tune control model obtained through training. After obtaining the self-made song or the self-made speech by using the model, the server delivers the self-made song or the self-made speech to the terminal. Alternatively, the server mixes the self-made song or the self-made speech with an accompaniment and delivers the self-made song or the self-made speech with the accompaniment to the terminal. Alternatively, the terminal may complete the foregoing process locally.

In the foregoing embodiment, the user may independently select the lyrics, the tune, and the timbre, customize the satisfactory song, and then use the customized song as the background audio to record the video, so that there are richly varied sources of background audio and the efficiency of video recording is improved.

In an embodiment, the audio synthesis method further includes: receiving, by the terminal, a selection instruction; performing, in a case that the target song is selected by the selection instruction, the step of obtaining a self-made song synthesized according to a tune control model, the target text, and tune information of the target song; and obtaining, in a case that a target speaking object is selected by the selection instruction, self-made audio synthesized according to a timbre control model and the target text, the timbre control model matching the target speaking object.

The selection instruction may be a computer-readable instruction triggered according to an operation of the user. The selection instruction is used for selecting a target. The target may be a target song or a target speaking object. The timbre control model is an ML model having a timbre control capability after training.

Specifically, the terminal may provide a candidate song list or a candidate speaking object list in the interface, then detect a predefined trigger operation on the displayed candidate song or candidate speaking object, and trigger the generation of a corresponding selection instruction when detecting the trigger operation. After determining that the selection instruction is used to point to the target song, the terminal performs the step of obtaining a self-made song synthesized according to a tune control model, the target text, and tune information of the target song.

After determining that the selection instruction is used to point to the target speaking object, the terminal obtains the self-made audio synthesized according to the timbre control model and the target text, the timbre control model matching the target speaking object. It may be understood that, in this embodiment, it may be implemented that a user selects to speak in the sound of a virtual character or a real character.

In an embodiment, the obtaining self-made audio synthesized according to a timbre control model and the target text includes: searching for the timbre control model matching the target speaking object; determining a phoneme sequence corresponding to the target text; synthesizing a self-made speech according to the phoneme sequence by using the timbre control model; and synthesizing the self-made audio according to the self-made speech and a background accompaniment.

The timbre control model matching the target speaking object is a timbre control model obtained through training according to audio data of the target speaking object, and the timbre of a speech outputted by using the timbre control model is consistent with the timbre of the target speaking object.

The phoneme is a minimum phonetic unit obtained by performing division according to a natural attribute of speech. For example, the syllable /i/ includes one phoneme, the syllable /ei/ includes two phonemes, and the syllable /dei/ includes three phonemes. The terminal may store a correspondence between a character and a phoneme.

Specifically, after obtaining the target text, the terminal may determine the phoneme sequence corresponding to the target text according to the correspondence between the character and the phoneme, then input the phoneme sequence corresponding to the target text into the trained timbre control model, to determine an acoustic parameter corresponding to each phoneme by using a hidden layer of the timbre control model, and then determine a speech waveform unit corresponding to each phoneme according to the acoustic parameter corresponding to each phoneme by using the hidden layer of the timbre control model, to output a speech waveform corresponding to the target text according to the speech waveform unit corresponding to each phoneme by using an output layer of the timbre control model, to obtain the self-made speech.

The self-made speech outputted by the timbre control model is a speech sound of the target speaking object without the background accompaniment. The terminal may mix the self-made speech with the background accompaniment to obtain the self-made audio.

In this embodiment, the strong learning capability of the ML model is used to learn the timbre control capability, and speech synthesis is performed by using the trained timbre control model. Compared with a conventional speech synthesis manner, the efficiency of speech synthesis is improved, and the accuracy of speech synthesis is improved.

In an embodiment, the audio synthesis method further includes a step of training a timbre control model matching each candidate speaking object, the target speaking object being selected from the candidate speaking objects; and the training a timbre control model matching each candidate speaking object includes: collecting an audio material corresponding to each candidate speaking object; determining a phoneme material sequence corresponding to the corresponding candidate speaking object according to each audio material; and obtaining the timbre control model matching each candidate speaking object through training by using the phoneme material sequence corresponding to each candidate speaking object.

Specifically, the terminal may collect the audio material corresponding to each candidate speaking object. For each candidate speaking object, audio segmentation is performed on the audio material corresponding to the candidate speaking object, to obtain a phoneme sequence sample corresponding to the audio material. The phoneme sequence sample is used as input data to train the timbre control model, to output audio conforming to the timbre of the candidate speaking object. The terminal may further adjust a model parameter of the timbre control model according to a difference between the outputted audio and the audio material of the inputted phoneme sequence sample. After adjusting the parameter, the terminal may continue with the training until the training of the timbre control model is completed. In this way, the terminal separately trains a matching timbre control model for each candidate speaking object.

After obtaining the timbre control model through training, the terminal may locally store the timbre control model, to obtain and use the timbre control model when the timbre control model needs to be used. The process of training the timbre control model may be alternatively performed on the server. After completing the training of the timbre control model, the server delivers the timbre control model to the terminal for use.

In an embodiment, before inputting the phoneme sequence into the timbre control model, the terminal may further perform sentence segmentation on the target text, and insert a segmentation symbol into the phoneme sequence according to a result of the sentence segmentation, so that the synthesized self-made speech has a syllabication effect, thereby further optimizing a playback effect.

In an embodiment, after synthesizing the self-made speech, the terminal may perform syllabication on the self-made speech. Generally, one syllable represents one character. In this way, the terminal may adjust time information of each syllable, for example, the start time of each syllable, the duration of each syllable, and the duration of a pause between different syllables, so that the rhythm of the self-made speech conforms to the tune information. The terminal may further adjust the pitch of each syllable, for example, the fundamental frequency and sound intensity of each syllable, so that the melody of the self-made speech conforms to the tune information, thereby obtaining the self-made song with the target text as the lyrics, the tune consistent with that of the target song, and the timbre consistent with that of the target speaking object.

In the foregoing embodiment, the user may independently select the lyrics and the tune, customize the satisfactory song, and then use the customized song as the background audio to record the video. Alternatively, the user may independently select the target timbre, to obtain the speech conforming to the timbre selected by the user.

In an embodiment, the receiving a selection instruction includes: receiving, by the terminal, a selection instruction corresponding to a virtual object additional element; and determining the target speaking object corresponding to the virtual object additional element selected by the selection instruction. The audio synthesis method further includes: configuring, by the terminal, the self-made audio as background audio; superimposing the virtual object additional element to an acquired image to obtain a video frame; and generating a recorded video based on the background audio and the video frame obtained through superimposition.

The virtual object additional element is data with visual content being a virtual object image. The virtual object additional element may be added to an image to modify image content. The virtual object additional element may be, for example, a virtual object accessory. The virtual object additional element may be dynamic data such as a dynamic picture or may be static data such as a static picture.

Specifically, the terminal may provide a virtual object additional element list in the interface, then detect a predefined trigger operation on the displayed virtual object additional element, trigger a corresponding selection instruction when detecting the trigger operation, and select the virtual object additional element pointed to by the selection instruction. The terminal then uses a virtual object corresponding to the selected virtual object additional element as the target speaking object. Further, the terminal may obtain a target text, convert the target text into self-made audio according to a timbre control model matching the target speaking object, then acquire an image by using an image acquisition apparatus, and superimpose the virtual object additional element to the acquired image to obtain a video frame. The terminal may also render the obtained video frame to form a preview image, and record a video based on the self-made audio.

Figure 5:
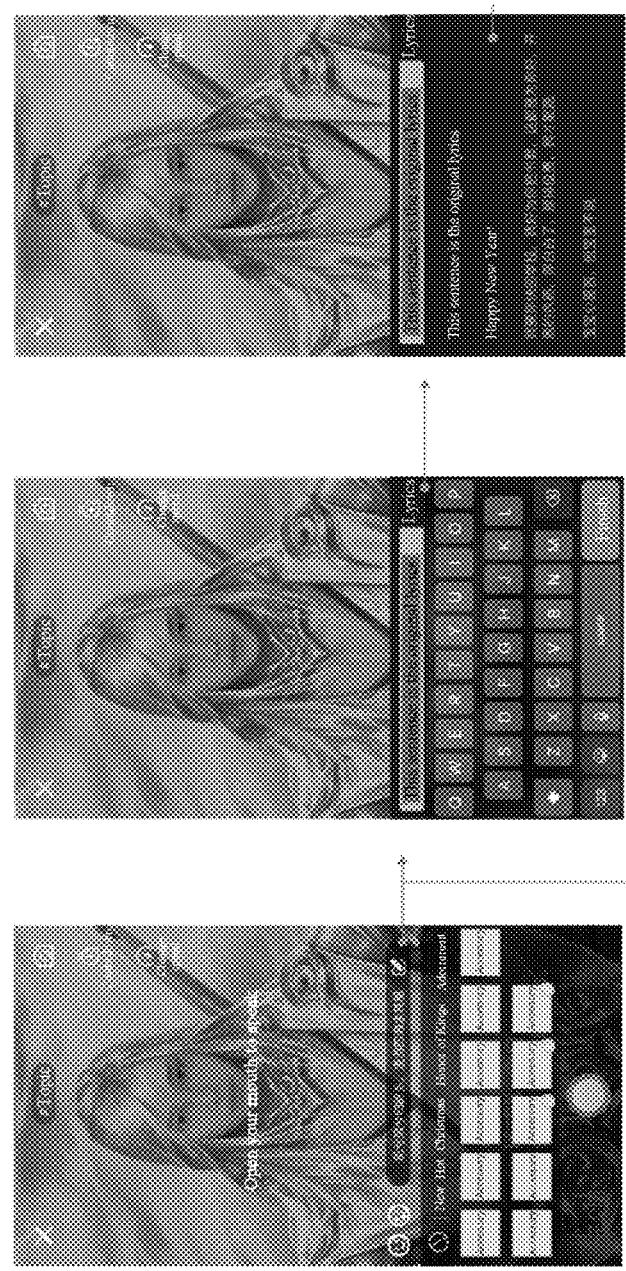
FIG. 5 is a schematic diagram of an interface for recording a video according to an embodiment.

For example, FIG. 5 is a schematic diagram of an interface for recording a video according to an embodiment. Referring to the left figure in FIG. 5, the interface includes a virtual object additional element list 510 and a text input box portal 520. The user may perform selection in the virtual object additional element list 510, so that the terminal obtains a virtual object additional element 511 selected by the user form the virtual object additional element list 510, and uses a virtual object corresponding to the virtual object additional element as the target speaking object. The user may open a text input box 530 by using the text input box portal 520. As shown in the middle figure in FIG. 5, the target text is inputted into the text input box, or as shown in the right figure in FIG. 5, the target text is selected from a candidate text template.

In a specific scenario, the terminal may provide a hero accessory of a game on a shooting interface of a video recording application, allow the user to customize a text, and then use the voice of a hero to read the text customized by the user, thereby achieving the effect of directly instructing the hero of the game to speak. When recording a video by using the self-made audio as the background audio after the self-made speech is synthesized, the user may achieve the effect of imitation from a plurality of dimensions such as the costume, voice, and mouth shape by performing lip-sync performance.

In an embodiment, the receiving a selection instruction includes: receiving, by the terminal, a selection instruction for a simulated video call; and determining a picture corresponding to the target speaking object selected by the selection instruction. The audio synthesis method further includes: configuring the self-made audio as background audio; generating a call video frame according to the picture and an acquired image; and generating a recorded video based on the background audio and the generated call video frame.

Specifically, the terminal may provide an interaction portal in a video playing interface. The terminal may enter an interaction interface through the interaction portal according to a user instruction. The terminal may provide a simulated video call portal in the interaction interface, determine, after receiving the selection instruction acting on the simulated video call portal, that the target speaking object selected by the selection instruction is an object in a currently played video or a user releasing the video, then determine the picture corresponding to the target speaking object, generate the call video frame according to the determined picture and the acquired image, and generate the video of video calling with the target speaking object based on the background audio and the generated call video frame.

The terminal may further provide a text input box in the interaction interface, obtain an inputted target text, convert the target text into a self-made speech according to timbre information of the determined target speaking object, and generate the recorded video by using the self-made speech and the generated call video frame. In this way, an effect that the user can directly control a video call object to speak what the user wants the video call object to speak to the user can be achieved.

Figure 6:
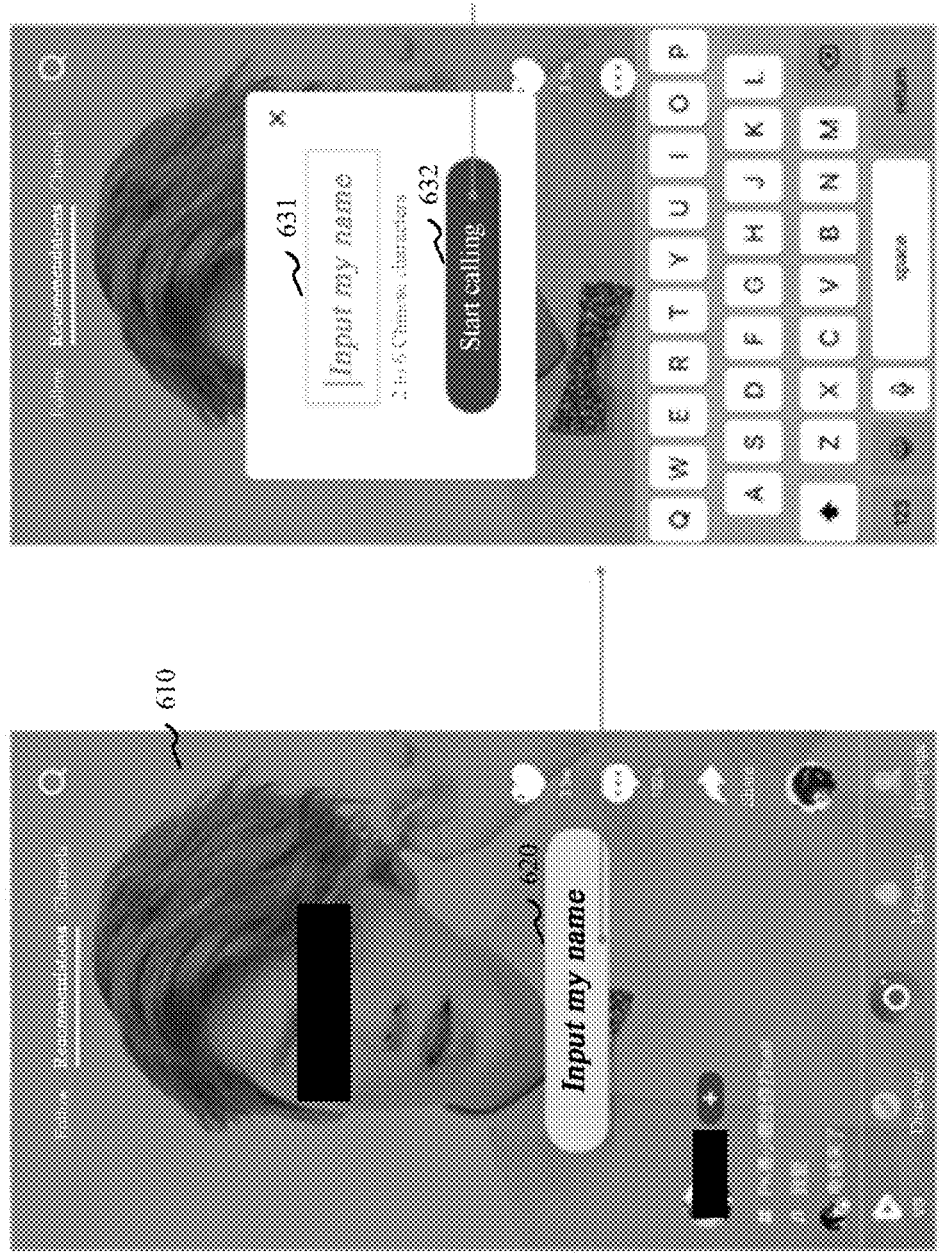
FIG. 6 is a schematic diagram of an interface for providing an interaction portal according to an embodiment.

For example, FIG. 6 is a schematic diagram of an interface for providing an interaction portal according to an embodiment. Referring to the left figure in FIG. 6, the interface includes a video frame 610 of a currently played video and an interaction portal 620. The terminal may enter the interaction interface shown in the right figure in FIG. 6 by using the interaction portal 620 according to a user instruction. The interaction interface includes a text input box 631 and a simulated video call portal 632. The user may simulate a video call with an object in the video frame 610 through the simulated video call portal 632. The user may input a text by using the text input box 631, and the terminal then obtains the text inputted by the user as a target text to synthesize a self-made speech and play the self-made speech during simulated video call as the content of the simulated video call.

Figure 7:
FIG. 7 is a schematic diagram of an interface for simulating a video call according to an embodiment.
Figure 7:
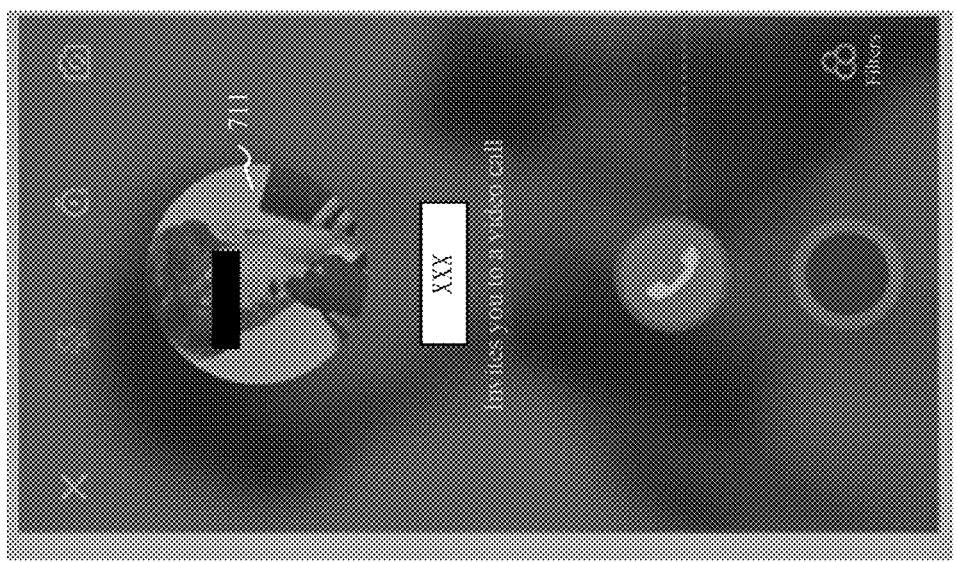

FIG. 7 is a schematic diagram of an interface for simulating a video call according to an embodiment. Referring to the left figure in FIG. 7, a video call invite interface is shown. The video call invite interface includes a picture 711 corresponding to the target speaking object. The user may perform the simulated video call by using a video call answer portal. Alternatively, the terminal may enter a video call interface after the video call invite interface is rendered for preset duration. Still referring to the right figure in FIG. 7, a video call interface is shown. The interface includes a picture 721 corresponding to the target speaking object (the video object) and an acquired image 722, to simulate a scenario of a video call with the target speaking object.

In a specific scenario, the terminal may provide a feature "A star speaks your name" in a video recording application. When the user watches a video, a pop-up window for guiding the input of a name appears, and a text of two to four characters may be inputted according to the guidance. The inputted text is first transmitted to the server for security authentication. If the text conforms to a rule, speech synthesis processing is performed on the text and a star corpus inputted by the user. A synthesized self-made speech is returned to the terminal. The terminal jumps to a shooting page in response to a jump behavior, and loads a material of a call from a star (the video call invite interface). After the material is loaded successfully, a page of an incoming call from the star can be seen. The star reads the inputted text in the video (that is, the self-made speech is played), and the user appears in the upper right of the shooting interface in the form of a small window, thereby achieving the effect that the user and the star are displayed on the same screen. A unique video with the user and the star on the same screen can be obtained by pressing a shooting button.

It is to be understood that, although the steps in the flowcharts of the foregoing embodiments are displayed sequentially according to indication of arrows, these steps are not necessarily performed sequentially according to a sequence indicated by the arrows. Unless explicitly specified in this specification, these steps are performed without any strict sequence limitation, and may be performed in another sequence. In addition, at least some steps in the foregoing embodiments may include a plurality of sub-steps or a plurality of stages. These sub-steps or stages are not necessarily performed at the same moment, but may be performed at different moments. These sub-steps or stages are not necessarily performed sequentially, but may be performed in turn or alternately with at least some of other steps or sub-steps or stages of other steps.

Figure 8:
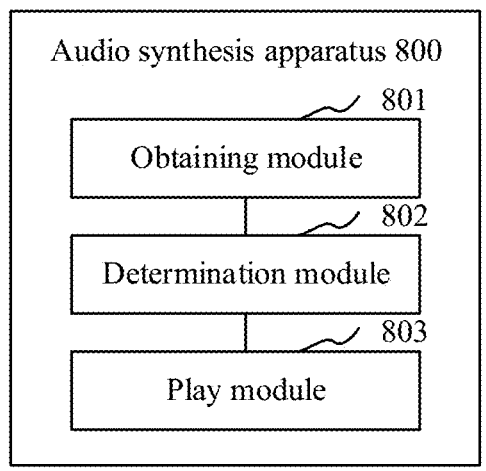
FIG. 8 is a diagram of the modular structure of an audio synthesis apparatus according to an embodiment.

As shown in FIG. 8, in an embodiment, an audio synthesis apparatus 800 is provided. Referring to FIG. 8, the audio synthesis apparatus 800 includes: an obtaining module 801, a determination module 802, and a play module 803.

The obtaining module 801 is configured to obtain a target text.

The determination module 802 is configured to determine a target song selected by a selection instruction.

The obtaining module 801 is further configured to obtain a self-made song synthesized according to a tune control model, the target text, and tune information of the target song, the target text being used as the lyrics of the self-made song.

The play module 803 is configured to play the self-made song.

Optionally, the audio synthesis apparatus 800 may not include the play module 803. That is, the audio synthesis apparatus 800 may only include the obtaining module 801 and the determination module 802, so that based on the audio synthesis apparatus 800, the self-made song can be obtained after the target text is obtained and the target song is determined, thereby implementing audio synthesis.

In an embodiment, the obtaining module 801 is further configured to: transmit the target text and a song identifier of the target song to a server, the target text and the song identifier being used for instructing the server to synthesize, after tune information corresponding to the song identifier is found, the self-made song according to the tune control model, the target text, and the tune information; and receive the self-made song fed back by the server.

In an embodiment, the obtaining module 801 is further configured to: search for the tune information matching the target song; input the target text and the tune information into the tune control model, and determine a tune feature corresponding to each character in the target text according to the tune information by using a hidden layer of the tune control model; and output, by using an output layer of the tune control model, the self-made song obtained after speech synthesis is performed on each character in the target text according to the corresponding tune feature.

In an embodiment, the audio synthesis apparatus 800 further includes a training module 804, configured to train a tune control model, and specifically configured to: collect candidate song audio corresponding to candidate songs; determine a candidate song tune corresponding to each candidate song according to the collected candidate song audio; obtain a text sample; and obtain the tune control model through training according to the text sample and the candidate song tune. The target song is selected from the candidate songs.

In an embodiment, the determination module 802 is further configured to determine a target speaking object. The obtaining module 801 is further configured to: search for a tune control model corresponding to the target speaking object; and obtain the self-made song synthesized according to the found tune control model, the target text, and the tune information of the target song, the timbre of the self-made song conforming to the target speaking object.

Figure 9:
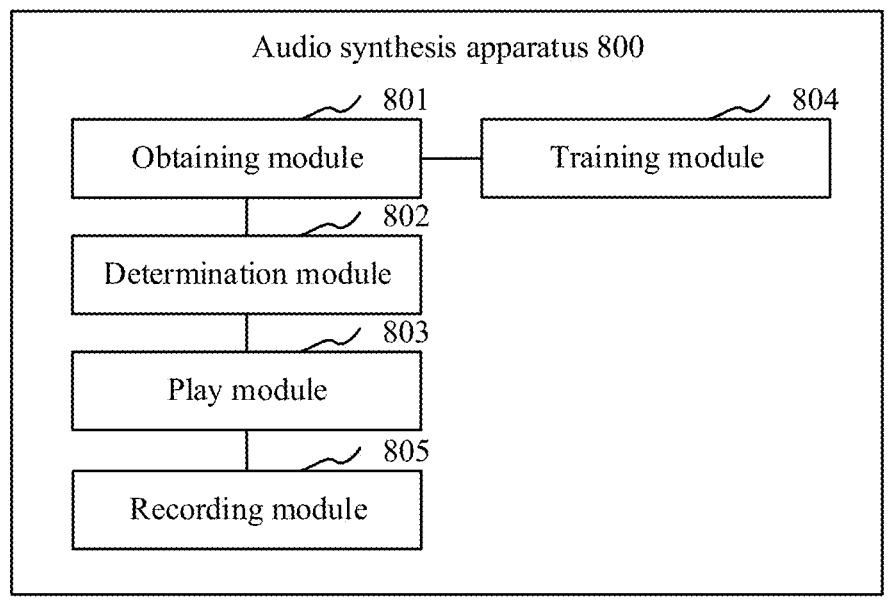
FIG. 9 is a diagram of the modular structure of an audio synthesis apparatus according to another embodiment.

As shown in FIG. 9, in an embodiment, the audio synthesis apparatus 800 further includes the training module 804 and a recording module 805.

The recording module 805 is configured to: configure the self-made song as background audio; and record a video based on the background audio.

In an embodiment, the obtaining module 801 is further configured to receive a selection instruction. When the target song is selected by the selection instruction, the obtaining module 801 is further configured to obtain the self-made song synthesized according to the tune control model, the target text, and the tune information of the target song. When a target speaking object is selected by the selection instruction, the obtaining module 801 is further configured to obtain self-made audio synthesized according to a timbre control model and the target text, the timbre control model matching the target speaking object.

In an embodiment, the training module 804 is further configured to train a timbre control model matching each candidate speaking object, and is specifically configured to: collect an audio material corresponding to each candidate speaking object; determine a phoneme material sequence corresponding to the corresponding candidate speaking object according to each audio material; and obtain the timbre control model matching each candidate speaking object through training by using the phoneme material sequence corresponding to each candidate speaking object, the target speaking object being selected from the candidate speaking objects.

In an embodiment, the obtaining module 801 is further configured to: search for the timbre control model matching the target speaking object; determine a phoneme sequence corresponding to the target text; synthesize a self-made speech according to the phoneme sequence by using the timbre control model; and synthesize the self-made audio according to the self-made speech and a background accompaniment.

In an embodiment, the obtaining module 801 is further configured to: receive a selection instruction corresponding to a virtual object additional element; and determine the target speaking object corresponding to the virtual object additional element selected by the selection instruction. The recording module 805 is further configured to: configure the self-made audio as background audio; superimpose the virtual object additional element to an acquired image to obtain a video frame; and generate a recorded video based on the background audio and the video frame obtained through superimposition.

In an embodiment, the obtaining module 801 is further configured to: receive a selection instruction for a simulated video call; and determine a picture corresponding to the target speaking object selected by the selection instruction. The recording module 805 is further configured to: configure the self-made audio as background audio; generate a call video frame according to the picture and an acquired image; and generate a recorded video based on the background audio and the generated call video frame.

Figure 10:
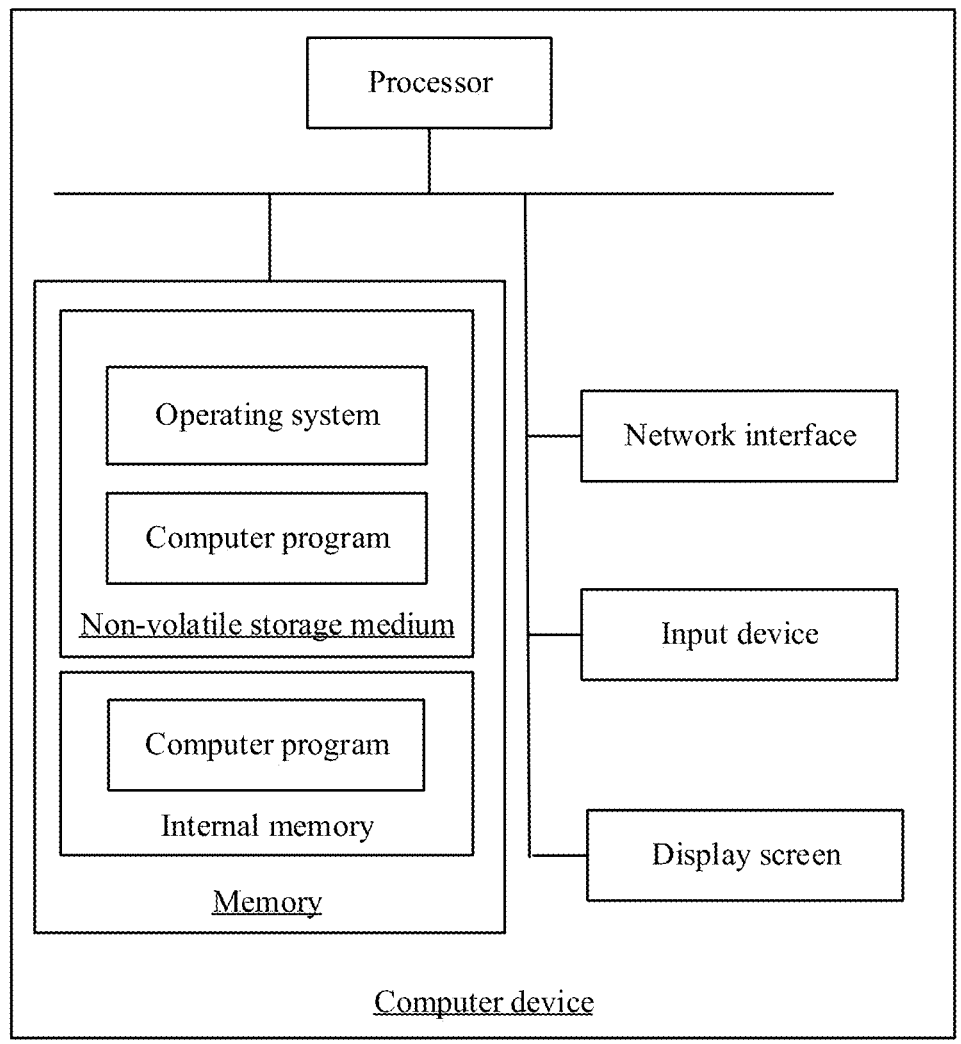
FIG. 10 is a diagram of the internal structure of a computer device according to an embodiment.

FIG. 10 is a diagram of the internal structure of a computer device according to an embodiment. The computer device may be specifically the terminal 110 in FIG. 1. As shown in FIG. 10, the computer device includes a processor, a memory, a network interface, an input device, and a display screen that are connected by a system bus. The memory includes a non-volatile storage medium and an internal memory. The non-volatile storage medium of the computer device stores an operating system, and may further store a computer program. The computer program, when executed by the processor, may cause the processor to implement an audio synthesis method. The internal memory may also store a computer program. The computer program, when executed by the processor, may cause the processor to perform the audio synthesis method. The display screen of the computer device may be a liquid crystal display screen, an e-ink display screen or the like. The input device may be a touch layer covering the display screen, or may be a key, a trackball or a touchpad disposed on a housing of the computer device, or may be an external keyboard, a touchpad, a mouse or the like. A person skilled in the art may understand that the structure shown in FIG. 10 is merely a block diagram of a partial structure related to the solution of this application, and does not limit the computer device to which the solution of this application is applied. Specifically, the computer device may include more or fewer components than those shown in the figure, or some components may be combined, or a different component deployment may be used.

In an embodiment, the audio synthesis apparatus provided in this application may be implemented in the form of a computer program. The computer program may run on the computer device shown in FIG. 10. The non-volatile storage medium of the computer device may store program modules forming the audio synthesis apparatus, for example, the obtaining module 801, the determination module 802, and the play module 803 shown in FIG. 8. The computer program formed by the program modules causes the processor to perform the steps of the audio synthesis method in the embodiments of this application described in this specification.

For example, the computer device shown in FIG. 10 may obtain a target text by using the obtaining module 801 in the audio synthesis apparatus 800 shown in FIG. 8; determine, by using the determination module 802, a target song selected by a selection instruction; obtain, by using the obtaining module 801, a self-made song synthesized according to a tune control model, the target text, and tune information of the target song, the target text being used as the lyrics of the self-made song; and play the self-made song by using the play module 803.

In an embodiment, a computer-readable storage medium is provided, storing a computer program, the computer program, when executed by a processor, causing the processor to perform the following steps: obtaining a target text; determining a target song selected by a selection instruction; obtaining a self-made song synthesized according to a tune control model, the target text, and tune information of the target song, the target text being used as the lyrics of the self-made song; and playing the self-made song.

In an embodiment, the obtaining a self-made song synthesized according to a tune control model, the target text, and tune information of the target song includes: transmitting the target text and a song identifier of the target song to a server, the target text and the song identifier being used for instructing the server to synthesize, after tune information corresponding to the song identifier is found, the self-made song according to the tune control model, the target text, and the tune information; and receiving the self-made song fed back by the server.

In an embodiment, the obtaining a self-made song synthesized according to a tune control model, the target text, and tune information of the target song includes: searching for the tune information matching the target song; inputting the target text and the tune information into the tune control model, and determining a tune feature corresponding to each character in the target text according to the tune information by using a hidden layer of the tune control model; and outputting, by using an output layer of the tune control model, the self-made song obtained after speech synthesis is performed on each character in the target text according to the corresponding tune feature.

In an embodiment, the computer program further causes the processor to perform the following step: training a tune control model, and the target song is selected from candidate songs. The training a tune control model includes: collecting candidate song audio corresponding to the candidate songs; determining a candidate song tune corresponding to each candidate song according to the collected candidate song audio; obtaining a text sample; and obtaining the tune control model through training according to the text sample and the candidate song tune.

In an embodiment, the computer program further causes the processor to perform the following step: determining a target speaking object. The obtaining a self-made song synthesized according to a tune control model, the target text, and tune information of the target song includes: searching for a tune control model corresponding to the target speaking object; and obtaining the self-made song synthesized according to the found tune control model, the target text, and the tune information of the target song, the timbre of the self-made song conforming to the target speaking object.

In an embodiment, the computer program further causes the processor to perform the following steps: configuring the self-made song as background audio; and recording a video based on the background audio.

In an embodiment, the computer program further causes the processor to perform the following steps: receiving a selection instruction; performing, in a case that the target song is selected by the selection instruction, the step of obtaining a self-made song synthesized according to a tune control model, the target text, and tune information of the target song; and obtaining, in a case that a target speaking object is selected by the selection instruction, self-made audio synthesized according to a timbre control model and the target text, the timbre control model matching the target speaking object.

In an embodiment, the computer program further causes the processor to perform the following step: training a timbre control model matching each candidate speaking object, the target speaking object being selected from the candidate speaking objects. The training a timbre control model matching each candidate speaking object includes: collecting an audio material corresponding to each candidate speaking object; determining a phoneme material sequence corresponding to the corresponding candidate speaking object according to each audio material; and obtaining the timbre control model matching each candidate speaking object through training by using the phoneme material sequence corresponding to each candidate speaking object.

In an embodiment, the obtaining self-made audio synthesized according to a timbre control model and the target text includes: searching for the timbre control model matching the target speaking object; determining a phoneme sequence corresponding to the target text; synthesizing a self-made speech according to the phoneme sequence by using the timbre control model; and synthesizing the self-made audio according to the self-made speech and a background accompaniment.

In an embodiment, the receiving a selection instruction includes: receiving a selection instruction corresponding to a virtual object additional element; and determining the target speaking object corresponding to the virtual object additional element selected by the selection instruction. The computer program further causes the processor to perform the following steps: configuring the self-made audio as background audio; superimposing the virtual object additional element to an acquired image to obtain a video frame; and generating a recorded video based on the background audio and the video frame obtained through superimposition.

In an embodiment, the receiving a selection instruction includes: receiving a selection instruction for a simulated video call; and determining a picture corresponding to the target speaking object selected by the selection instruction. The computer program further causes the processor to perform the following steps: configuring the self-made audio as background audio; generating a call video frame according to the picture and an acquired image; and generating a recorded video based on the background audio and the generated call video frame.

In an embodiment, a computer device is provided, including a memory and a processor, the memory storing a computer program, the computer program, when executed by the processor, causing the processor to perform the following steps: obtaining a target text; determining a target song selected by a selection instruction; obtaining a self-made song synthesized according to a tune control model, the target text, and tune information of the target song, the target text being used as the lyrics of the self-made song; and playing the self-made song.

In an embodiment, the obtaining a self-made song synthesized according to a tune control model, the target text, and tune information of the target song includes: transmitting the target text and a song identifier of the target song to a server, the target text and the song identifier being used for instructing the server to synthesize, after tune information corresponding to the song identifier is found, the self-made song according to the tune control model, the target text, and the tune information; and receiving the self-made song fed back by the server.

In an embodiment, the obtaining a self-made song synthesized according to a tune control model, the target text, and tune information of the target song includes: searching for the tune information matching the target song; inputting the target text and the tune information into the tune control model, and determining a tune feature corresponding to each character in the target text according to the tune information by using a hidden layer of the tune control model; and outputting, by using an output layer of the tune control model, the self-made song obtained after speech synthesis is performed on each character in the target text according to the corresponding tune feature.

In an embodiment, the computer program further causes the processor to perform the following step: training a tune control model, and the target song is selected from candidate songs. The training a tune control model includes: collecting candidate song audio corresponding to the candidate songs; determining a candidate song tune corresponding to each candidate song according to the collected candidate song audio; obtaining a text sample; and obtaining the tune control model through training according to the text sample and the candidate song tune.

In an embodiment, the computer program further causes the processor to perform the following step: determining a target speaking object. The obtaining a self-made song synthesized according to a tune control model, the target text, and tune information of the target song includes: searching for a tune control model corresponding to the target speaking object; and obtaining the self-made song synthesized according to the found tune control model, the target text, and the tune information of the target song, the timbre of the self-made song conforming to the target speaking object.

In an embodiment, the computer program further causes the processor to perform the following steps: configuring the self-made song as background audio; and recording a video based on the background audio.

In an embodiment, the computer program further causes the processor to perform the following steps: receiving a selection instruction; performing, in a case that the target song is selected by the selection instruction, the step of obtaining a self-made song synthesized according to a tune control model, the target text, and tune information of the target song; and obtaining, in a case that a target speaking object is selected by the selection instruction, self-made audio synthesized according to a timbre control model and the target text, the timbre control model matching the target speaking object.

In an embodiment, the computer program further causes the processor to perform the following step: training a timbre control model matching each candidate speaking object, the target speaking object being selected from the candidate speaking objects. The training a timbre control model matching each candidate speaking object includes: collecting an audio material corresponding to each candidate speaking object; determining a phoneme material sequence corresponding to the corresponding candidate speaking object according to each audio material; and obtaining the timbre control model matching each candidate speaking object through training by using the phoneme material sequence corresponding to each candidate speaking object.

In an embodiment, the obtaining self-made audio synthesized according to a timbre control model and the target text includes: searching for the timbre control model matching the target speaking object; determining a phoneme sequence corresponding to the target text; synthesizing a self-made speech according to the phoneme sequence by using the timbre control model; and synthesizing the self-made audio according to the self-made speech and a background accompaniment.

In an embodiment, the receiving a selection instruction includes: receiving a selection instruction corresponding to a virtual object additional element; and determining the target speaking object corresponding to the virtual object additional element selected by the selection instruction. The computer program further causes the processor to perform the following steps: configuring the self-made audio as background audio; superimposing the virtual object additional element to an acquired image to obtain a video frame; and generating a recorded video based on the background audio and the video frame obtained through superimposition.

In an embodiment, the receiving a selection instruction includes: receiving a selection instruction for a simulated video call; and determining a picture corresponding to the target speaking object selected by the selection instruction. The computer program further causes the processor to perform the following steps: configuring the self-made audio as background audio; generating a call video frame according to the picture and an acquired image; and generating a recorded video based on the background audio and the generated call video frame.

A person of ordinary skill in the art may understand that all or some of the processes in the method of the foregoing embodiments may be implemented by a computer program instructing related hardware. The program may be stored in a non-volatile computer-readable storage medium, and the program, when executed, may include the processes of the foregoing method embodiments. Any reference to a memory, storage, database or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration rather than limitation, the RAM is available in a plurality of forms, such as a static RAM (SRAM), a dynamic RAM (DRAM), a synchronous DRAM (SDRAM), a dual data rate SDRAM (DDRS- DRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only show several implementations of this application and are described in detail, but they are not to be construed as a limitation to the patent scope of this application. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. An audio synthesis method performed at a computer device having a processor and memory storing a plurality of programs to be executed by the processor, the method comprising:
    obtaining a target text from a user;
    determining a target song according to a selection instruction, the target text being independent from the target song and the target song being associated with an original singer;
    selecting a virtual character from a plurality of virtual characters, wherein the plurality of virtual characters are third-parties different from the user and the original singer;
    searching for a tune control model corresponding to the virtual character;
    synthesizing a self-made song using the target text and tune information of the target song according to the found tune control model, the target text being used as lyrics of the self-made song and timbre of the self-made song conforming to the virtual character different from the user and the original singer; and
    playing the self-made song while recording a video using the computer device. wherein the self-made song becomes background audio of the video being recorded.

2. The method according to claim 1, wherein the synthesizing a self-made song using the target text and tune information of the target song according to a tune control model comprises:
    searching for the tune information matching the target song;
    inputting the target text and the tune information into the tune control model, and determining a tune feature corresponding to each character in the target text according to the tune information by using a hidden layer of the tune control model; and
    outputting, by using an output layer of the tune control model, the self-made song obtained after speech synthesis is performed on each character in the target text according to the corresponding tune feature.

3. The method according to claim 1, wherein the target song is selected from multiple candidate songs; and the tune control model is trained by:
    collecting candidate song audio corresponding to the candidate songs;
    determining a candidate song tune corresponding to each candidate song according to the collected candidate song audio;
    obtaining a text sample; and
    obtaining the tune control model through training according to the text sample and the candidate song tune.

4. The method according to claim 1, further comprising synthesizing self-made audio using the target text according to a timbre control model matching a target speaking object, wherein the timbre control model is trained by:
    collecting an audio material corresponding to each candidate speaking object;
    determining a phoneme material sequence corresponding to the corresponding candidate speaking object according to each audio material; and
    obtaining the timbre control model matching each candidate speaking object through training by using the phoneme material sequence corresponding to each candidate speaking object.

5. The method according to claim 4, wherein the synthesizing the self-made audio using the target text according to a timbre control model comprises:
    searching for the timbre control model matching the target speaking object;
    determining a phoneme sequence corresponding to the target text;
    synthesizing a self-made speech according to the phoneme sequence by using the timbre control model; and
    synthesizing the self-made audio according to the self-made speech and a background accompaniment.

6. The method according to claim 1, further comprising:
    configuring the self-made audio as background audio;
    superimposing a virtual object additional element on an acquired image to obtain a video frame; and
    generating a recorded video using the background audio and the video frame obtained through superimposition.

7. The method according to claim 1, further comprising:
    configuring the self-made audio as background audio;
    generating a call video frame according to a picture corresponding to a target speaking object and an acquired image; and
    generating a recorded video using the background audio and the generated call video frame.

8. A computer device, comprising a memory and a processor, the memory storing a plurality of computer programs, the computer programs, when executed by the processor, causing the computer device to perform a plurality of operations including:
    obtaining a target text from a user;
    determining a target song according to a selection instruction, the target text being independent from the target song and the target song being associated with an original singer;
    selecting a virtual character from a plurality of virtual characters, wherein the plurality of virtual characters are third-parties different from the user and the original singer;
    searching for a tune control model corresponding to the virtual character;
    synthesizing a self-made song using the target text and tune information of the target song according to the found tune control model, the target text being used as lyrics of the self-made song and timbre of the self-made song conforming to the virtual character different from the user and the original singer; and playing the self-made song while recording a video using the computer device. wherein the self-made song becomes background audio of the video being recorded.

9. The computer device according to claim 8, wherein the synthesizing a self-made song using the target text and tune information of the target song according to a tune control model comprises:
   searching for the tune information matching the target song;
   inputting the target text and the tune information into the tune control model, and determining a tune feature corresponding to each character in the target text according to the tune information by using a hidden layer of the tune control model; and
   outputting, by using an output layer of the tune control model, the self-made song obtained after speech synthesis is performed on each character in the target text according to the corresponding tune feature.

10. The computer device according to claim 8, wherein the plurality of operations further comprise:
    configuring the self-made song as background audio; and
    recording a video using the background audio.

11. The computer device according to claim 8, wherein the plurality of operations further comprises synthesizing self-made audio using the target text according to a timbre control model, comprising:
    searching for the timbre control model matching a target speaking object;
    determining a phoneme sequence corresponding to the target text;
    synthesizing a self-made speech according to the phoneme sequence by using the timbre control model; and
    synthesizing the self-made audio according to the self-made speech and a background accompaniment.

12. The computer device according to claim 8, wherein the plurality of operations further comprise:
    configuring the self-made audio as background audio;
    superimposing a virtual object additional element on an acquired image to obtain a video frame; and
    generating a recorded video using the background audio and the video frame obtained through superimposition.

13. The computer device according to claim 8, wherein the plurality of operations further comprise:
    configuring the self-made audio as background audio;
    generating a call video frame according to a picture corresponding to a target speaking object and an acquired image; and
    generating a recorded video using the background audio and the generated call video frame.

14. A non-transitory computer-readable storage medium storing a plurality of computer programs, the computer programs, when executed by a processor of a computer device, causing the computer device to perform a plurality of operations including:
    obtaining a target text from a user;
    determining a target song according to a selection instruction, the target text being independent from the target song and the target song being associated with an original singer;
    selecting a virtual character from a plurality of virtual characters, wherein the plurality of virtual characters are third-parties different from the user and the original singer;
    searching for a tune control model corresponding to the virtual character;
    synthesizing a self-made song using the target text and tune information of the target song according to the found tune control model, the target text being used as lyrics of the self-made song and timbre of the self-made song conforming to the virtual character different from the user and the original singer;
    playing the self-made song while recording a video using the computer device. wherein the self-made song becomes background audio of the video being recorded.

15. The non-transitory computer-readable storage medium according to claim 14, wherein the synthesizing a self-made song using the target text and tune information of the target song according to a tune control model comprises:
    searching for the tune information matching the target song;
    inputting the target text and the tune information into the tune control model, and determining a tune feature corresponding to each character in the target text according to the tune information by using a hidden layer of the tune control model; and
    outputting, by using an output layer of the tune control model, the self-made song obtained after speech synthesis is performed on each character in the target text according to the corresponding tune feature.

* * * * *